US012777996B2

(12) United States Patent
Knoblauch

(10) Patent No.: US 12,777,996 B2
(45) Date of Patent: Nov. 3, 2026

(54) SYSTEM AND METHOD FOR GENERATING TILLAGE PRESCRIPTION MAPS USING SOIL DATA

(71) Applicant: CNH Industrial America LLC, New Holland, PA (US)

(72) Inventor: Joshua D. Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 1084 days.

(21) Appl. No.: 17/501,131

(22) Filed: Oct. 14, 2021

(65) Prior Publication Data

US 2023/0120855 A1 Apr. 20, 2023

(51) Int. Cl.
*A01B 79/00* (2006.01)
*G01S 13/86* (2006.01)
*G01S 13/88* (2006.01)

(52) U.S. Cl.
CPC ............ *A01B 79/005* (2013.01); *G01S 13/86* (2013.01); *G01S 13/885* (2013.01)

(58) Field of Classification Search
CPC ..... A01B 79/00; A01B 79/005; G01S 13/885; G01S 13/86
See application file for complete search history.

(56) References Cited

U.S. PATENT DOCUMENTS 5,771,169 A 6/1998 Wendte
6,082,466 A 7/2000 Gudat
6,791,488 B2 9/2004 Diekhans et al.
9,924,629 B2 3/2018 Batcheller et al.
10,371,814 B2 * 8/2019 Chan ..................... A01C 7/085
10,531,603 B2 1/2020 Ferrari et al.
10,649,079 B1 * 5/2020 LaPrade ................ G01S 13/003
2018/0310474 A1 11/2018 Posselius et al.
(Continued)

FOREIGN PATENT DOCUMENTS

EP 2837909 2/2015
EP 3195719 A1 * 7/2017 ........... A01F 25/186
(Continued)

OTHER PUBLICATIONS

LogicGeo, Logic Geophysics Ground Penetrating Radar (GPR) surveying experts, 2019, https://www.logicgeophysics.com/gpr ( Year: 2019).*

*Primary Examiner* — Justin C Mikowski
*Assistant Examiner* — Ashley A Kaercher
(74) *Attorney, Agent, or Firm* — Dority & Manning, P.A.

(57) ABSTRACT

An agricultural harvester includes a frame configured to support a crop processing system and a sensor supported on the frame, with the sensor configured to capture data indicative of one or more subsurface soil layers present within the field across which the agricultural harvester is traveling. Furthermore, the agricultural harvester includes a computing system communicatively coupled to the sensor. The computing system is configured to identify the one or more subsurface soil layers within the field based on the data captured by the sensor and generate a tillage prescription map for use during a subsequent tillage operation based on the identified one or more subsurface soil layers. The tillage prescription map, in turn, prescribes a penetration depth for a tillage tool at a plurality of locations within the field.

14 Claims, 7 Drawing Sheets

(56) References Cited

U.S. PATENT DOCUMENTS

| | | | | |
|---|---|---|---|---|
| 2019/0064795 | A1 * | 2/2019 | Berggren | B60D 1/44 |
| 2020/0229361 | A1 * | 7/2020 | Canyon | G01S 13/885 |
| 2020/0236836 | A1 * | 7/2020 | Barrick | A01B 79/005 |
| 2020/0255140 | A1 * | 8/2020 | Nahuel-Andrejuk | G05D 1/0094 |
| 2020/0404830 | A1 * | 12/2020 | Ferrari | G01S 13/42 |
| 2022/0022362 | A1 * | 1/2022 | Anderson, Jr. | G06N 20/20 |

FOREIGN PATENT DOCUMENTS

| | | | | |
|---|---|---|---|---|
| WO | WO-2017049186 A1 * | 3/2017 | | A01B 33/16 |
| WO | WO 2019/079205 | 4/2019 | | |

* cited by examiner

SYSTEM AND METHOD FOR GENERATING TILLAGE PRESCRIPTION MAPS USING SOIL DATA

FIELD OF THE INVENTION

The present disclosure generally relates to systems and methods for generating agricultural prescription maps and, more particularly, to systems and methods for generating tillage prescription maps using soil data.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

During a tillage operation, it is generally desirable to control the penetration depth of the tillage tools to ensure the soil is properly cultivated. In this respect, systems have been developed that generate a tillage prescription map for use during a subsequent tillage operation. The tillage prescription map, in turn, prescribes the penetration depth of the tillage tools at various locations within the field. While such systems work well, further improvements are needed.

Accordingly, an improved system and method for generating tillage prescription maps would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a frame configured to support a crop processing system and a sensor supported on the frame, with the sensor configured to capture data indicative of one or more subsurface soil layers present within the field across which the agricultural harvester is traveling. Furthermore, the agricultural harvester includes a computing system communicatively coupled to the sensor. The computing system is configured to identify the one or more subsurface soil layers within the field based on the data captured by the sensor and generate a tillage prescription map for use during a subsequent tillage operation based on the identified one or more subsurface soil layers. The tillage prescription map, in turn, prescribes a penetration depth for a tillage tool at a plurality of locations within the field.

In another aspect, the present subject matter is directed to a system for generating tillage prescription maps. The system includes an agricultural harvester configured to travel across a field to perform an agricultural harvesting operation on the field. Additionally, the system includes a sensor supported on the agricultural harvester, with the sensor configured to capture data indicative of one or more subsurface soil layers present within the field across which the agricultural harvester is traveling. Moreover, the system includes a computing system communicatively coupled to the sensor. The computing system is configured to identify the one or more subsurface soil layers within the field based on the data captured by the sensor and generate a tillage prescription map for use during a subsequent tillage operation based on the identified one or more subsurface soil layers. The tillage prescription map, in turn, prescribes a penetration depth for a tillage tool at a plurality of locations within the field.

In a further aspect, the present subject matter is directed to a method for generating tillage prescription maps using an agricultural harvester. The agricultural harvester, in turn, includes a frame and a sensor supported on the frame. The method includes controlling, with a computing system, an operation of the agricultural harvester such that the agricultural harvester travels across a field to perform a harvesting operation thereon. In addition, the method includes receiving, with the computing system, data from the sensor that is indicative of one or more subsurface soil layers present within the field as the agricultural harvester travels across the field. Furthermore, the method includes identifying, with the computing system, the one or more subsurface soil layers within the field based on the received data. Additionally, the method includes generating, with the computing system, a tillage prescription map for use during a subsequent tillage operation based on the identified one or more subsurface soil layers, with the tillage prescription map prescribing a penetration depth for a tillage tool at a plurality of locations within the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
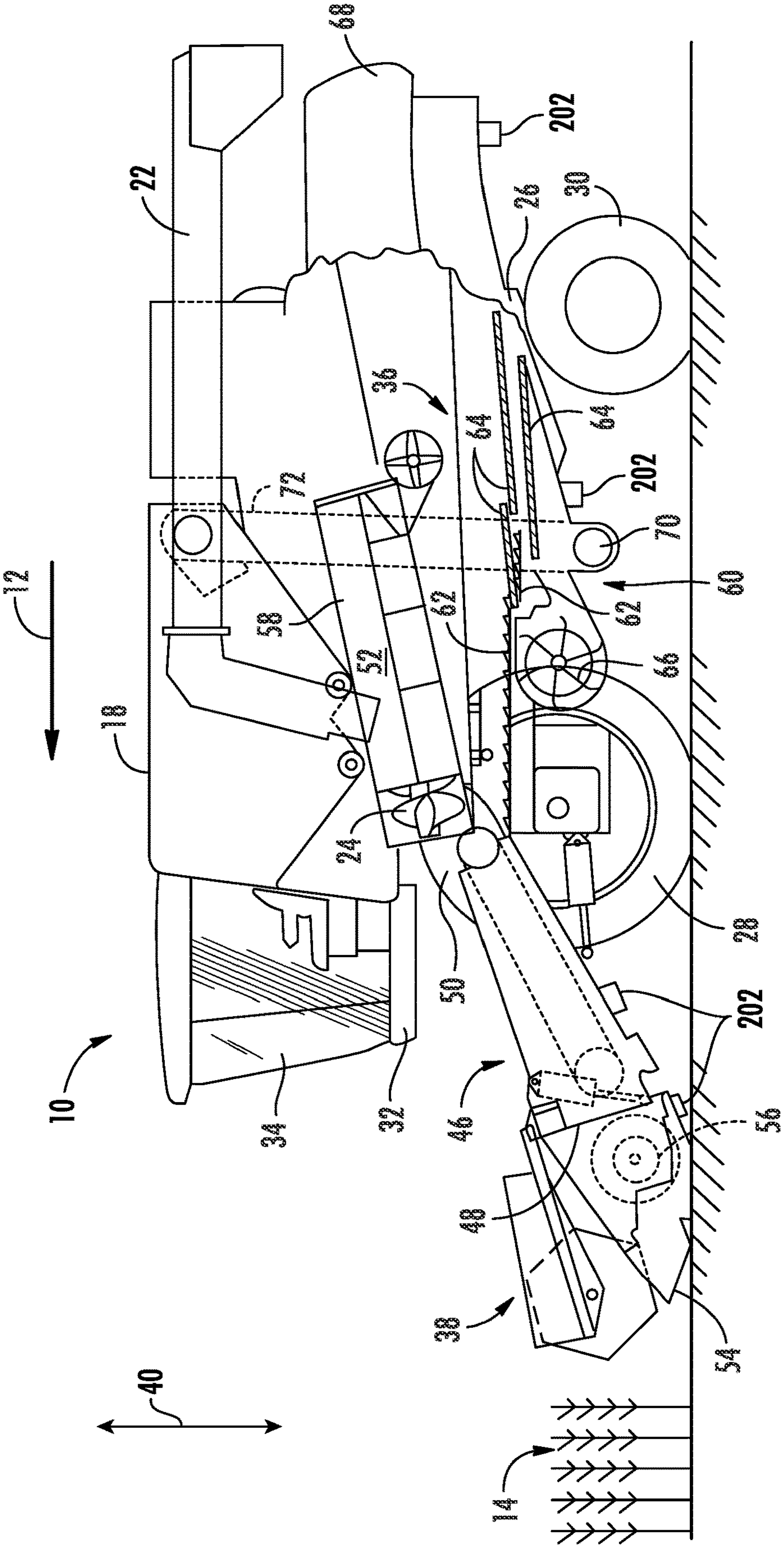
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for generating tillage prescription maps. As will be described below, a tillage prescription map is a map or other data structure that prescribes the penetration depth(s) for a tillage tool(s) (e.g., a ground-penetrating shank(s)) of a tillage implement at a plurality of locations within the field. In this respect, the generated tillage maps may be used during a subsequent tillage operation to control the operation of the tillage implement.

In several embodiments, the disclosed system includes one or more soil sensors mounted or otherwise supported on an agricultural harvester. The sensor(s) is, in turn, configured to capture data indicative of one or more subsurface soil layers present within the field as the agricultural harvester travels across the field (e.g., to perform a harvesting operation thereon). In some embodiments, each sensor may include one or more ground-penetrating radar (GPR) sensing devices (e.g., first and second GPR sensing devices operating at first and second frequencies, respectively) and an electromagnetic induction (EMI) sensing device. For example, in such embodiments, the GPR sensing device(s) may allow for detection of a compaction layer within the field. A compaction layer, in turn, is a subsurface layer of soil that breaks down and compacts (e.g., due to vehicle traffic, ponding, and/or the like), thereby becoming much denser than the surrounding soil. Furthermore, in such embodiments, the EMI sensing device may allow for detection of a B-horizon within the field. The B-horizon is, in turn, a subsurface layer of clay, iron oxides, gravel, and/or the like positioned below the seedbed that is generally unsuitable for planting crops.

Additionally, a computing system of the disclosed system is configured to generate a tillage prescription map based on one or more identified subsurface soil layer(s) within the field. Specifically, in several embodiments, the computing system may generate a representation (e.g., a three-dimensional representation) of the soil within the field based on the data captured by the sensor. The representation, in turn, depicting or otherwise provide information associated with the subsurface soil layer(s) present within the field. For example, in some embodiments, the computing system may analyze the generated representation to determine the positions of the top surface of the B-horizon and/or the bottom surface of the compaction layer. Thereafter, the computing system generates a tillage prescription map for use during a subsequent tillage operation based on the determined positions of the top surface of the B-horizon and/or the bottom surface of the compaction layer. The tillage prescription map may, in turn, prescribes the penetration depths for the tillage tool(s) at a plurality of locations within the field such that, during the subsequent tillage operation, the tip(s) of the tool(s) penetrates through the compaction layer but remains above the B-horizon.

Using data captured by a soil sensor(s) mounted on an agricultural harvester to generate tillage prescription maps improves the efficiency of farming operations and reduces the resources needed to generate such maps. Specifically, to obtain the necessary data to generate a tillage prescription map, many farmers will traverse the entirety of the field on an all-terrain vehicle (ATV) or a pick-up truck after completion of a harvesting operation. This is a time-consuming and expensive operation that does not perform an agricultural operation (e.g., a tillage operation, a planting operation, a harvesting operation, etc.) on the field. However, an agricultural harvester travels across the entirety of field when harvesting crops. Moreover, harvesting is completed prior to the performance of any tillage operation(s) before the planting of subsequent crop. In this respect, by placing the disclosed sensor on the harvester and capturing data indicative of the subsurface soil layer(s) within the field during the harvesting operation, it is unnecessary to separately traverse the field with an ATV or pick-up truck. As such, the disclosed system and method eliminates the need for a farmer to traverse the entirety of the field when not performing a necessary agricultural operation thereon. This, in turn, improves efficiency of the farming operation and reduces the resources (e.g., fuel) consumed by the farming operation.

Referring now to the drawings, FIG. 1 illustrates a partial sectional side view of an agricultural harvester 10 in accordance with aspects of the present subject matter. In general, the harvester 10 is configured to travel across a field in a direction of travel (indicated by arrow 12) to harvest a standing crop 14. While traversing the field, the harvester 10 may be configured to process the harvested crop and store the harvested crop within a crop tank 18 of the harvester 10. Furthermore, the harvested crop may be unloaded from the crop tank 18 for receipt by a crop receiving vehicle (not shown) via a crop unloading tube 22 of the harvester 10.

As shown, the harvester 10 is configured as an axial-flow type combine in which the harvested crop is threshed and separated while being advanced by and along a longitudinally arranged rotor 24. However, in alternative embodiments, the harvester 10 may have any other suitable harvester configuration, such as a transverse-flow type combine.

The harvester 10 includes a chassis or frame 26 configured to support and/or couple to various components of the harvester 10. For example, in several embodiments, the harvester 10 may include a pair of driven, ground-engaging front wheels 28 and a pair of steerable rear wheels 30 coupled to the frame 26. As such, the wheels 28, 30 support the harvester 10 relative to the ground and move the harvester 10 in the direction of travel 12. Furthermore, the harvester 10 may include an operator's platform 32 having an operator's cab 34, a crop processing system 36, the crop tank 18, and the crop unloading tube 22 that are supported by the frame 26. As will be described below, the crop processing system 36 may be configured to perform various processing operations on the harvested crop as the crop processing system 36 operates to transfer the harvested crop between a harvesting implement 38 (e.g., header) of the harvester 10 and the crop tank 18.

Moreover, as shown in FIG. 1, the harvesting implement 38 and an associated feeder 46 of the crop processing system

36 extend forward of the frame 26 and are pivotably secured thereto for movement in a vertical direction (indicated by arrow 40). In general, the feeder 46 supports the harvesting implement 38. As shown in FIG. 1, the feeder 46 may extend between a front end 48 coupled to the harvesting implement 38 and a rear end 50 positioned adjacent to a threshing and separating assembly 52 of the crop processing system 36. Specifically, the rear end 50 of the feeder 46 may be pivotably coupled to a portion of the harvester 10. Thus, the harvesting implement 38 can be moved upward and downward relative to the ground along the vertical direction 40 to set the desired harvesting or cutting height for the harvesting implement 38.

As the harvester 10 is propelled in the direction of travel 12 over the field with the standing crop 14, the crop material is severed from the stubble by a sickle bar 54 at the front of the harvesting implement 38 and delivered by a harvesting implement auger 56 to the front end 48 of the feeder 46. The feeder 46, in turn, supplies the harvested crop to the threshing and separating assembly 52. In several embodiments, the threshing and separating assembly 52 may include a cylindrical chamber 58 in which the rotor 24 is rotated to thresh and separate the harvested crop received therein. That is, the harvested crop is rubbed and beaten between the rotor 24 and the inner surfaces of the chamber 58, whereby the grain, seed, or the like, is loosened and separated from the straw.

The harvested crop that has been separated by the threshing and separating assembly 52 may fall onto a crop cleaning assembly 60 of the crop processing system 36. In general, the crop cleaning assembly 60 may include a series of pans 62 and associated sieves 64. As such, the separated harvested crop may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop. For instance, the fan 66 may blow the impurities off the harvested crop for discharge from the harvester 10 through the outlet of a straw hood 68 positioned at the back end of the harvester 10. The cleaned harvested crop passing through the sieves 64 may then fall into a trough of an auger 70, which may transfer the harvested crop to an elevator 72 for delivery to the crop tank 18.

It should be further appreciated that the configuration of the agricultural harvester 10 described above and shown in FIG. 1 is provided only to place the present subject matter in an exemplary field of use. Thus, it should be appreciated that the present subject matter may be readily adaptable to any manner of agricultural harvester configuration.

As shown in FIG. 1, one or more soil sensors 202 are mounted on or otherwise supported on the frame 26 of the agricultural harvester 10. In general, the soil sensor(s) 202 is configured to capture data indicative of one or more subsurface soil layers (e.g., a compaction layer, B-horizon, etc.) present within the field across which the agricultural harvester 10 is traveling. For example, in several embodiments, each soil sensor 202 may include one or more ground-penetrating radar (GPR) sensing devices and one or more electromagnetic induction (EMI) sensing devices. As will be described below, the data captured by the soil sensor(s) 202 during the operation of the harvester 10 is used to generate a tillage prescription map for use during a subsequent tillage operation. The tillage prescription map, in turn, prescribes the penetration depth(s) for a tillage tool(s) (e.g., a ground-penetrating shank(s)) at a plurality of locations within the field.

The soil sensor(s) 202 may be mounted at any suitable location(s) on the agricultural harvester 10. For example, as shown in FIG. 1, the soil sensor(s) 202 may be mounted on the underside of the harvester 10, such as on the underside of the harvesting implement 38, the underside of the feeder 46, the underside of the frame 26 between the front wheels 28 and the rear wheels 30, and/or on the underside of the frame 26 aft of the rear wheels 30 (e.g., adjacent to the straw hood 68).

Additionally, any suitable number of soil sensors 202 may be supported on the frame 26 of the agricultural harvester 10. For example, in some embodiments, a single soil sensor 202 may be supported on the frame 26 of the harvester 10. In other embodiments, first and second soil sensors 202 may be supported at first and second locations on the frame 26 of the harvester 10. Alternatively, three or more soil sensors 202 may be mounted on the harvester 10.

Figure 2:
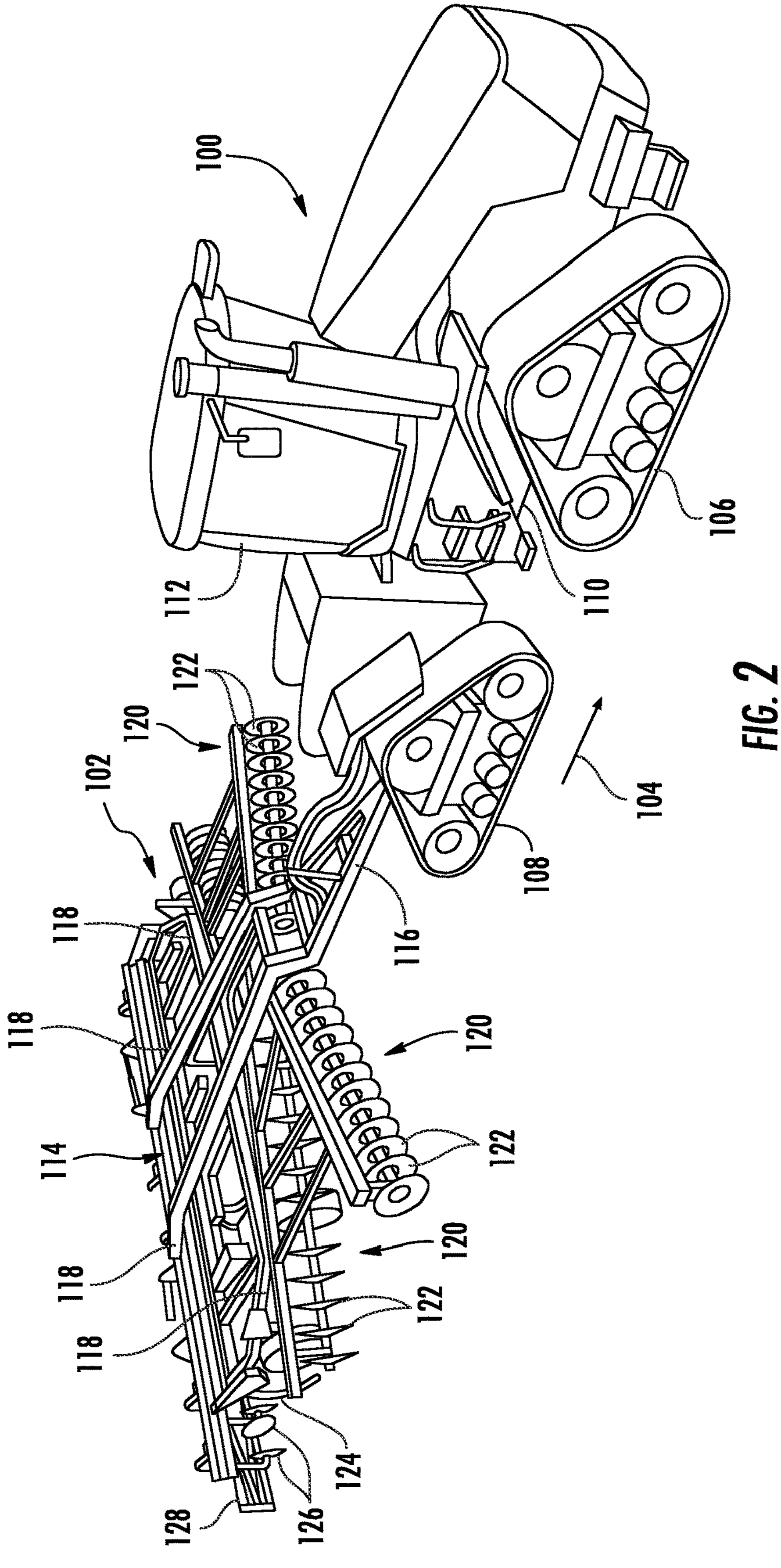
FIG. 2 illustrates a perspective view of one embodiment of a work vehicle towing a tillage implement in accordance with aspects of the present subject matter.

FIG. 2 illustrates a perspective view of one embodiment of a work vehicle 100 and an associated tillage implement 102. In general, the work vehicle 100 may be configured to tow the tillage implement 102 across a field in a direction of travel (indicated by arrow 104). As such, in the illustrated embodiment, the work vehicle 100 is configured as an agricultural tractor and the tillage implement 102 is configured as a disk ripper. However, in other embodiments, the work vehicle 100 may be configured as any other suitable work vehicle. Similarly, the tillage implement 102 may be configured as any other suitable tillage implement.

As shown, the work vehicle 100 may include a pair of front track assemblies 106, a pair or rear track assemblies 108, and a frame or chassis 110 coupled to and supported by the track assemblies 106, 108. An operator's cab 112 may be supported by a portion of the chassis 110 and may house various input devices (e.g., a user interface) for permitting an operator to control the operation of one or more components of the work vehicle 100 and/or one or more components of the tillage implement 102.

Additionally, as shown in FIG. 1, the tillage implement 102 may generally include a frame 114 configured to be towed by the vehicle 100 via a pull hitch or tow bar 116 in the direction of travel 104. In general, the frame 114 may include a plurality of structural frame members 118, such as beams, bars, and/or the like, configured to support or couple to a plurality of components. As such, the frame 114 may be configured to support a plurality of ground-engaging and/or ground-penetrating tools, such as a plurality of shanks, disk blades, leveling blades, basket assemblies, tines, spikes, and/or the like. As will be described below, the penetration depths of the ground-penetrating tools may be controlled based on a received tillage prescription map.

In one embodiment, the various ground-engaging and/or ground-penetrating tools may be configured to perform a ripping operation or any other suitable tillage operation on the field across which the implement 102 is being towed. For example, in the illustrated embodiment, the frame 114 is configured to support various gangs 120 of disk blades 122, a plurality of ground-penetrating shanks 124, a plurality of leveling blades 126, and a plurality of crumbler wheels or basket assemblies 128. However, in alternative embodiments, the frame 114 may be configured to support any other suitable ground-engaging tool(s), ground-penetrating tool (s), or combinations of such tools.

Figure 3:
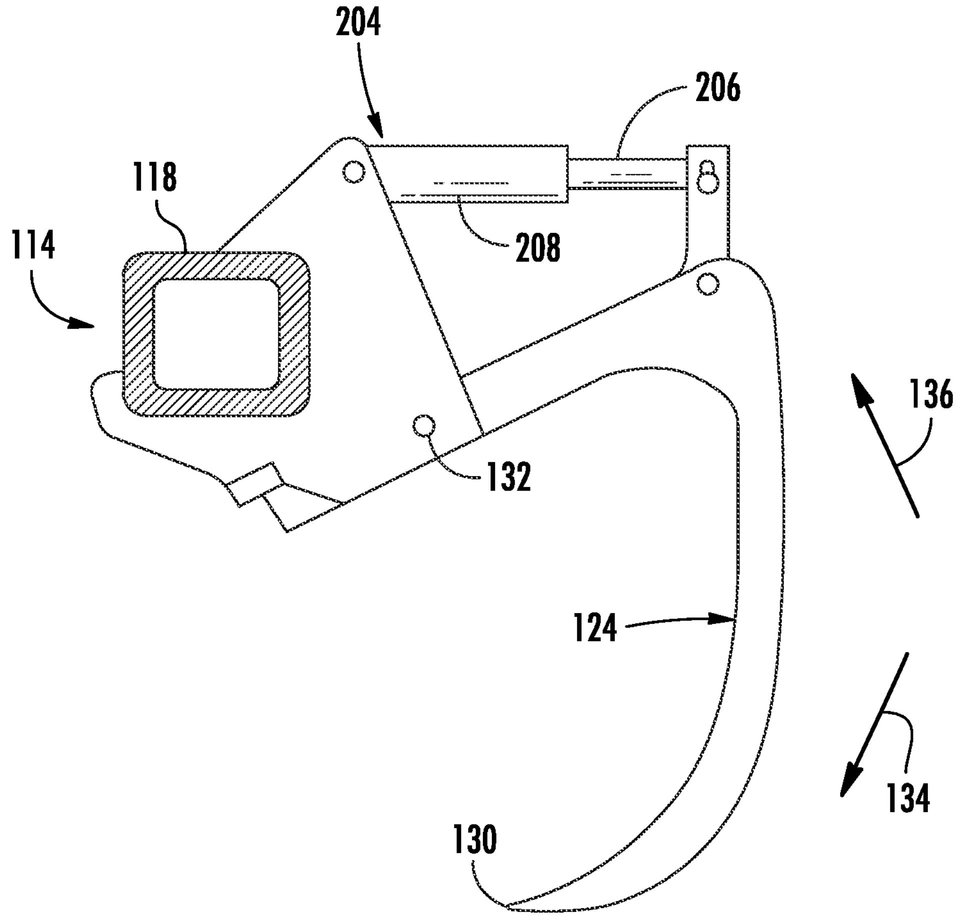
FIG. 3 illustrates a side view of one embodiment of a shank of a tillage implement in accordance with aspects of the present subject matter.

FIG. 3 illustrates a side view of one embodiment of one of the shanks 124 of the implement 102 described above with reference to FIG. 2. As indicated above, the shanks 124 may be configured to till or otherwise cultivate the soil. In this regard, one end of each shank 124 may include a tip 130 configured to penetrate the soil within the field to a penetration depth as the tillage implement 102 is pulled across the field. The opposed end of each shank 124 may be pivotably coupled to the implement frame 114, such as at a pivot point 132. As such, each shank 124 may be configured to pivot relative to the frame 114 in a manner that adjusts its penetration depth. In one embodiment, the various shanks 124 of the tillage implement 102 may be configured as rippers. However, in alternative embodiments, the shanks 124 may be configured as chisels, sweeps, tines, or any other suitable type of shanks. Furthermore, the other shanks coupled to the frame 114 may have the same or a similar configuration to as the shank 124 shown in FIG. 3.

In several embodiments, the tillage implement 102 may include one or more tillage tool actuators 204, with each actuator 204 coupled between the frame 114 and one of the shanks 124. In general, each actuator 204 may be configured to move or otherwise adjust the orientation or position of the corresponding shank 124 relative to the implement frame 114 in a manner that adjusts the penetration depth of the shank 124. More specifically, as shown in the illustrated embodiment, a first end of each actuator 204 (e.g., a rod 206 of each actuator 204) is coupled to the corresponding shank 124, while a second end of each actuator 204 (e.g., a cylinder 208 of each actuator 204) is coupled to the frame 114. As such, the rod 206 of each actuator 204 may be configured to extend relative to the corresponding cylinder 208 to pivot the corresponding shank 124 relative to the frame 114 in a first pivot direction (indicated by arrow 134), thereby increasing the penetration depth of the shank 124. Conversely, the rod 206 of each actuator 204 may be configured to retract relative to the corresponding cylinder 208 to pivot the corresponding shank 124 relative to the frame 114 in a second pivot direction (indicated by arrow 136), thereby decreasing the penetration depth of the shank 124. As will be described below, the operation of the actuator(s) 204 may be controlled based on a tillage prescription map generated based on soil sensor data captured during a harvesting operation (e.g., with the harvester 10). In this respect, the tip(s) 130 of the shank(s) 124 can be moved to the penetration depth(s) prescribed by the map at a plurality of locations within the field.

The tillage tool actuator(s) 204 may correspond to any suitable type of actuator(s). For example, in the illustrated embodiment, the actuator(s) 204 is configured as a fluid-driven actuator(s), such as a hydraulic or pneumatic cylinder (s). However, in alternative embodiments, the actuator(s) 204 may correspond to any other suitable type of actuator(s), such as an electric linear actuator(s).

It should be appreciated that the configuration of the work vehicle 100 and the tillage implement 102 described above and shown in FIGS. 2 and 3 is provided only to place the present subject matter in an exemplary field of use. Thus, it should be appreciated that the present subject matter may be readily adaptable to any manner of vehicle and/or tillage implement configuration.

Figure 4:
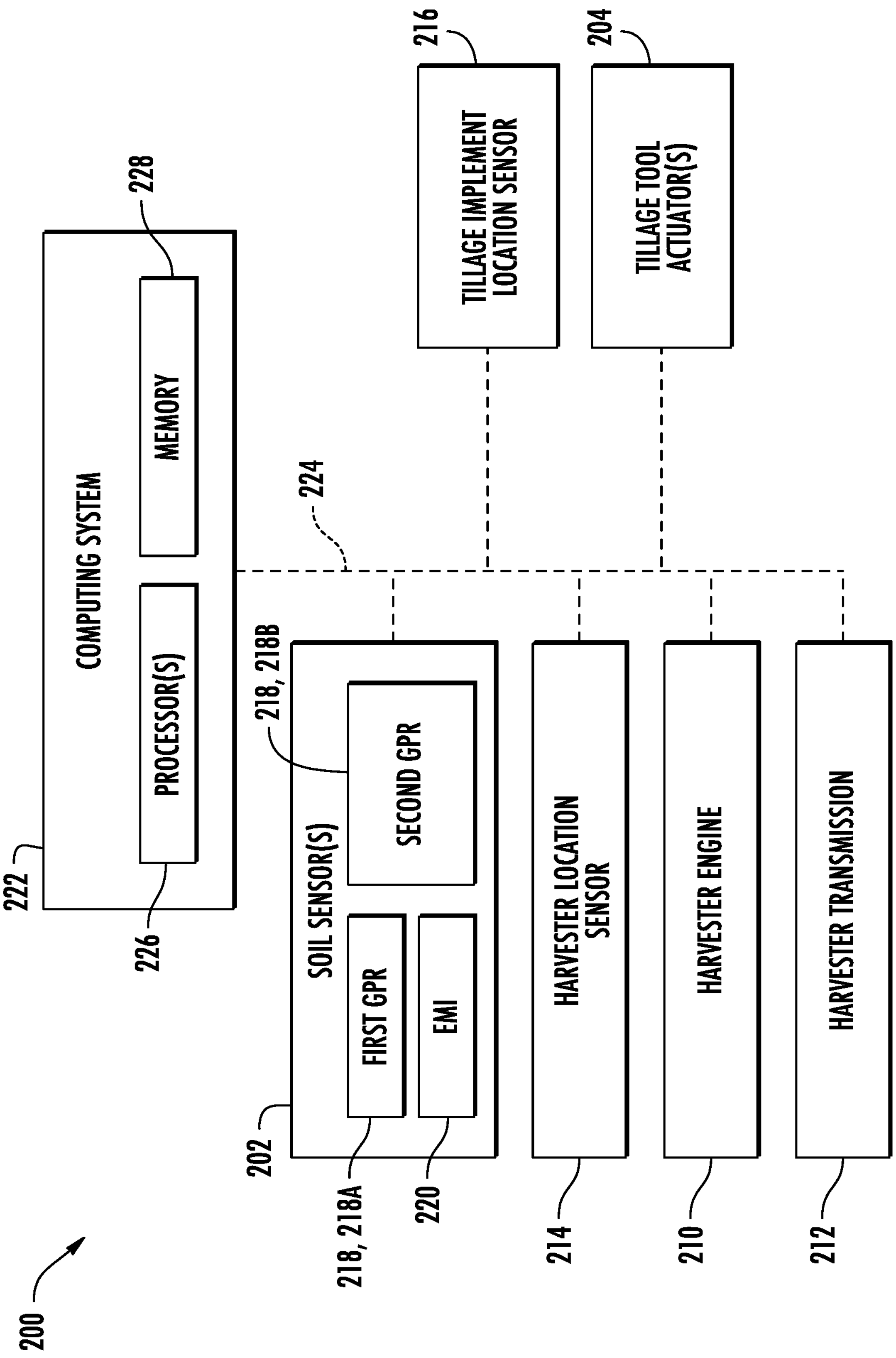
FIG. 4 illustrates a schematic view of one embodiment of a system for generating tillage prescription maps in accordance with aspects of the present subject matter.

Referring now to FIG. 4, a schematic view of one embodiment of a system 200 for generating tillage prescription maps is illustrated in accordance with aspects of the present subject matter. In general, the system 200 will be described herein with reference to the agricultural harvester 10 and the tillage implement 102 described above with reference to FIGS. 1-3. However, it should be appreciated by those of ordinary skill in the art that the disclosed system 200 may generally be utilized with agricultural harvesters having any other suitable harvester configuration and/or tillage implements having any other suitable implement configuration.

In several embodiments, the system 200 includes the agricultural harvester 10 or one or more components of the harvester 10. For example, in some embodiments, the system 200 may include an engine 210 of the harvester 10 and/or a transmission 212 of the harvester 10. Specifically, the engine 210 and the transmission 212 may be mounted on the frame 26 of the harvester 10 such that the transmission 212 is operably coupled to the engine 210. As such, the transmission 212 may provide variably adjusted gear ratios for transferring power generated by the engine 210 to the front wheels 28 via a drive axle assembly (or via axles if multiple drive axles are employed). Additionally, the system 200 may include any suitable components of the harvester 10, such as the crop processing system 36.

Moreover, the system 200 may include a harvester location sensor 214 installed on or otherwise operatively associated with the agricultural harvester 10. In general, the harvester location sensor 214 may be configured to determine the current location of the harvester 10 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the harvester location sensor 214 may be transmitted to a computing system (e.g., in the form coordinates) and stored within the computing system's memory for subsequent processing and/or analysis. As will be described below, the location data captured by the harvester location sensor 214 used to geolocate the data captured by the soil sensor(s) 202 for use in generating the tillage prescription map. For instance, based on the known dimensional configuration and/or relative positioning between the harvester location sensor 214 and the soil sensor(s) 202, the determined location from the location sensor 214 may be used to geolocate each soil sensor data measurement within the field.

Furthermore, in some embodiments, the system 200 may include the tillage implement 102 or one or more components of the tillage implement 102. For example, the system 200 may include the tillage tool actuator(s) 204 and/or any other suitable actuator(s) on the implement 102 configured to control the penetration depth of the tillage tool(s) thereon.

Moreover, the system 200 may include a tillage implement location sensor 216 installed on or otherwise operatively associated with the vehicle 100 and/or the tillage implement 102. In general, the tillage implement location sensor 216 may be configured to determine the current location of the vehicle 100 and/or the implement 102 using a satellite navigation positioning system. In such an embodiment, the location determined by the tillage implement location sensor 216 may be transmitted to the computing system (e.g., in the form coordinates) and stored within the computing system's memory for subsequent processing and/or analysis. For instance, based on the known dimensional configuration and/or relative positioning between the tillage implement location sensor 216 and the tillage tool(s) (e.g., the shanks 124) on the implement 102, the determined location from the tillage implement location sensor 216 may be used to geolocate the tillage tool(s) within the field. Determining the location of the tillage implement 102 and, more specifically, its tillage tool(s) within the field may allow for control of the implement 102 based on the generated tillage prescription map.

As shown in FIG. 4, the system 200 may include one or more soil sensors 202 that are installed on the agricultural harvester 10. In general, as mentioned above, the soil sensor(s) 202 may be configured to capture data indicative of one or more subsurface soil layers (e.g., a compaction layer and/or the B-horizon) present within the field as the harvester 10 travels across the field. Specifically, in several embodiments, the soil sensor(s) 202 may be non-contact-based sensor(s). As such, in some embodiments, each soil sensor 202 may include one or more ground-penetrating radar (GPR) sensing devices 218 and one or more electromagnetic induction (EMI) sensing devices 220. In such embodiments, the GPR sensing device(s) 218 may be configured to capture GPR data associated with the soil present within the field of view or sensor detection range of the GPR sensing device(s) 218. Similarly, the EMI sensing device(s) 220 may be configured to capture EMI data associated with the soil present within the field of view or sensor detection range of the EMI sensing device(s) 220. For example, in the illustrated embodiment, each soil sensor 202 includes a first GPR sensing device 218A, a second GPR sensing device 218B, and a single EMI sensing device 220. As will be described below, the captured GPR and/EMI data may be used to determine the position(s) of the subsurface soil layer(s).

The combination of GPR and EMI data may improve the accuracy of the subsurface soil layer depiction. For example, the GPR data may generally provide a more accurate representation of shallower subsurface soil layers (e.g., a compaction layer) than the EMI data. Conversely, the EMI data may generally provide a more accurate representation of deeper subsurface soil layers (e.g., the B-horizon) than the GPR data. Thus, the combination of GPR and EMI data allows for more accurate identification and depiction of the various subsurface soil layers as the thickness and/or depths of these subsurface soil layers can vary. Moreover, the combination of GPR and EMI data may allow a three-dimensional representation of the soil to be generated (that could not be generated by GPR or EMI data alone). As will be described below, in some embodiments, the representation of the soil may be used to generate the tillage prescription map.

The GPR sensing device(s) 112 may correspond to any suitable sensor(s) or sensing device(s) configured to capture data associated with the soil within the field using radio waves. For example, the GPR sensing device(s) 112 may be configured to emit one or more radio wave output signals directed toward a portion of the soil within its field of view or sensor detection zone. A portion of the output signal(s) may, in turn, be reflected by the compaction layer as an echo signal(s). Moreover, the GPR sensing device(s) 112 may be configured to receive the reflected echo signal(s). In this regard, the time of flight, amplitude, frequency, and/or phase of the received echo signal(s) may be used to determine the position of and/or other parameters (e.g., thickness, density, etc.) associated with the compaction layer. Furthermore, in one embodiment, the time of flight, amplitude, frequency, and/or phase of the received echo signal(s) may be used (in combination with the EMI data) to generate the three-dimensional representation.

In the illustrated embodiment, each soil sensor 202 includes first and second GPR sensing device 218A, 218B. In general, the first GPR sensing device 218A is configured to emit the output signal(s) at or otherwise operate at a first frequency. Conversely, the second GPR sensing device 218B is configured to emit the output signal(s) at or otherwise operate at a second or different frequency. The differing frequencies of the output signal(s) emitted by the first and second GPR sensing devices 218A, 218B allow these signals to penetrate the soil to differing depths. As such, the echo signal(s) received by the first GPR sensing device 218A may be used to determine the position of one of the top or bottom surfaces of the compaction layer. Conversely, the echo signal(s) received by the second GPR sensing device 218B may be used to determine the position of the other of the top or bottom surfaces of the compaction layer.

In addition, the EMI sensing device(s) 220 may correspond to any suitable sensor(s) or sensing device(s) configured to capture data associated with the soil within the field using electromagnetic induction. For example, each EMI sensing device 220 may include a coil(s) or other inductor (s). In this respect, as the harvester 10 travels across the field, the B-horizon may induce a current within the coil(s). The current may, in turn, vary with the parameters of the B-horizon (e.g., the position of its top surface, thickness, density, and/or the like). As such, the induced current may be used to determine the position of the top surface of the B-horizon and/or other parameters associated with the B-horizon. Additionally, in one embodiment, the induced current may be used (in combination with the GPR data) to generate the three-dimensional representation.

However, in alternative embodiments, the soil sensor(s) 202 may be configured as any other suitable sensor(s) or sensing device(s) configured to capture data that can be used to identify the subsurface soil layer(s) within the field as the harvester 10 travels across the field.

Furthermore, the system 200 may include a computing system 222 communicatively coupled to one or more components of the agricultural harvester 10, the vehicle 100, the implement 102, and/or the system 200 to allow the operation of such components to be electronically or automatically controlled by the computing system 222. For example, the computing system 222 may be communicatively coupled to the soil sensor(s) 202 via a communicative link 224. As such, the computing system 222 may be configured to receive data from the soil sensor(s) 202 that is indicative of the subsurface soil layer(s) present within the field as the harvester 10 travels across the field. In addition, the computing system 222 may be communicatively coupled to harvester engine 210, the harvester transmission 212, and/or the tillage tool actuator(s) 204 via the communicative link 224. In this respect, the computing system 222 may be configured to control the operation of these components such that the harvesting and/or tillage operations are performed on the field. Moreover, the computing system 222 may be communicatively coupled to the harvester and tillage implement location sensors 214, 216 via the communicative link 224. As such, the computing system 222 may be configured to receive location data from the harvester and tillage implement location sensors 214, 216 that is indicative of the locations of the harvester 10 and vehicle/implement 100/102 within the field, respectively. Additionally, the computing system 222 may be communicatively coupled to any other suitable components of the vehicle 100, the implement 102, and/or the system 200.

In general, the computing system 222 may comprise one or more processor-based devices, such as a given controller or computing device or any suitable combination of controllers or computing devices. Thus, in several embodiments, the computing system 222 may include one or more processor(s) 226 and associated memory device(s) 228 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 228 of the computing system 222 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 228 may generally be configured to store suitable computer-readable instructions that, when implemented by the processor(s) 226, configure the computing system 222 to perform various computer-implemented functions, such as one or more aspects of the methods and algorithms that will be described herein. In addition, the computing system 222 may also include various other suitable components, such as a communications circuit or module, one or more input/output channels, a data/control bus and/or the like.

The various functions of the computing system 222 may be performed by a single processor-based device or may be distributed across any number of processor-based devices, in which instance such devices may be considered to form part of the computing system 222. For instance, the functions of the computing system 222 may be distributed across multiple application-specific controllers or computing devices, such as a controller(s) of the agricultural harvester 10, a controller(s) of the vehicle 100, a controller(s) of the tillage implement 102, a remove server/computing device(s) (e.g., in a farm management office or in an offsite server farm), and/or the like.

Figure 5:
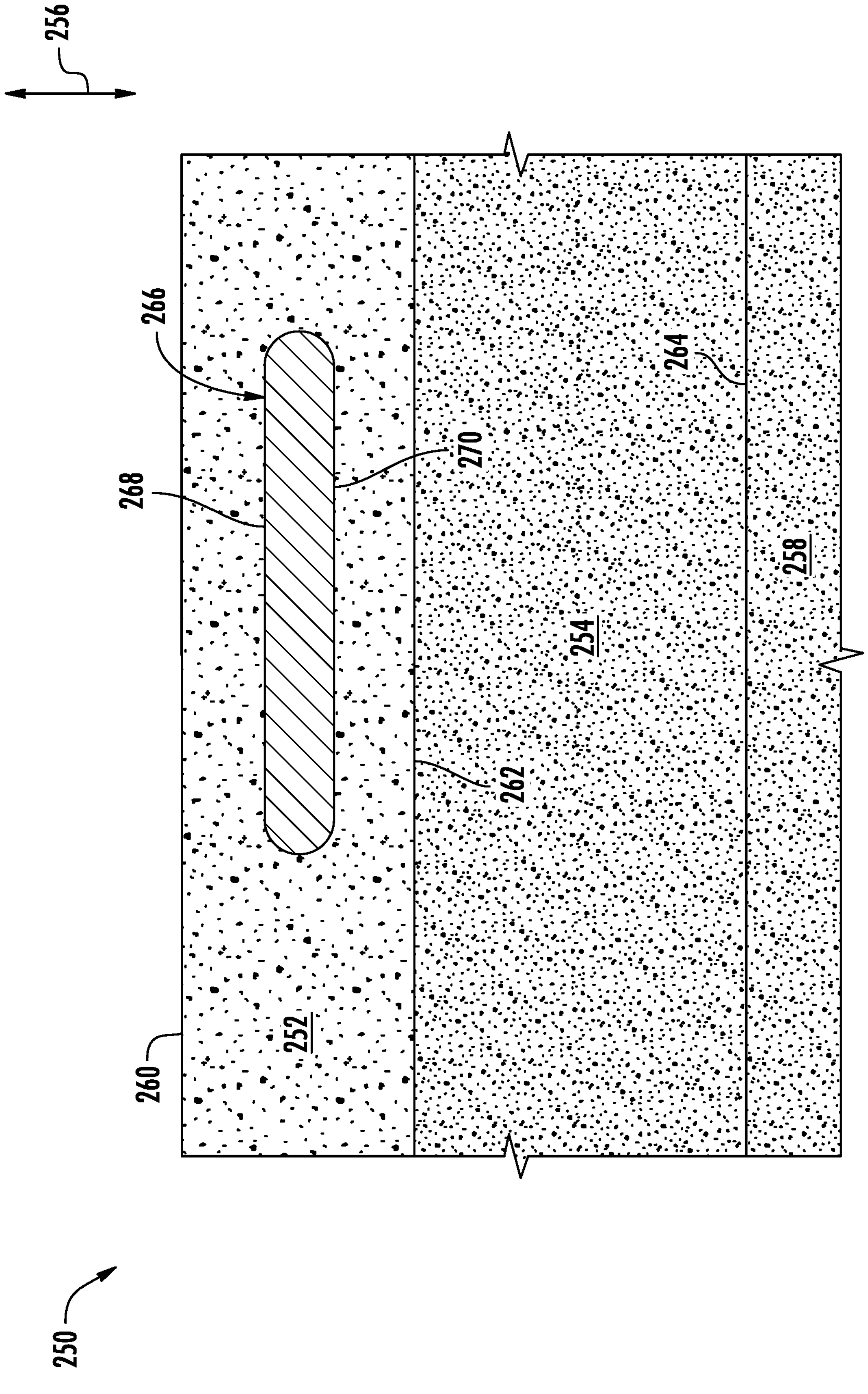
FIG. 5 illustrates an example cross-sectional view of soil within an agricultural field in accordance with aspects of the present subject matter, particularly illustrating various subsurface soil layers with the soil.

FIG. 5 illustrates an example cross-sectional view of a portion of the soil within an agricultural field 250. As shown, the illustrated portion of the field 250 includes an A-horizon 252, a B-horizon 254 positioned below the A-horizon 252 in a vertical direction (indicated by arrow 256), and a C-horizon 258 positioned below the B-horizon 254 in the vertical direction 256. More specifically, the A-horizon 252 extends from a top surface 260 of the field 250 downward in the vertical direction 256 to an A-B horizon interface 262. As such, the A-horizon 260 forms the topsoil of the field 250 and primarily contains dark decomposed organic matter (sometimes called humus). In general, the A-horizon 252 includes the most organic matter of the soil within the field and is suitable for planting. Thus, the seedbed being formed by a tillage operation is formed within the A-horizon 252. Furthermore, the B-horizon 254 extends from A-B horizon interface 262 downward in the vertical direction 256 to a B-C horizon interface 264. As such, the B-horizon 254 forms the subsoil of the field 250 and primarily contains clay minerals, iron oxides, and/or gravel, with little organic matter. In addition, the C-horizon 258 extends in the vertical direction 256 from the B-C horizon interface 264 downward in the vertical direction 256 to the bedrock (not shown). As such, the C-horizon 258 forms the substratum of the field 250 and primarily contains weathered bedrock and carbonates. In this respect, the B- and C-horizons 254, 258 are generally unsuitable for planting. Thus, it is generally desirable for the tillage tool(s) (e.g., the shank(s) 124) of the tillage implement 102 to positioned above the B-horizon 254 (i.e., above the A-B horizon interface 262, which is the top surface of the B-horizon 254) to prevent clay from being mixed into the seedbed.

Moreover, the illustrated portion of the field 250 includes a compaction layer 266. As shown in FIG. 5, the compaction layer 266 extends between a top surface 268 of the compaction layer 266 and a bottom surface 270 of the compaction layer 266 in the vertical direction 256. The top surface 268 of the compaction layer 266 is, in turn, positioned below the top surface 260 of the field 250, while the bottom surface 270 of the compaction layer 266 is positioned above the A-B horizon interface 262. In general, the compaction layer 266 is a portion of the soil within the A-horizon 252 that breaks down and compacts due to vehicle traffic, ponding, and/or the like. As such, the soil within the compaction layer 266 is much denser than the surrounding soil within the A-horizon 252. Thus, it is difficult from the roots of the crops planted within the field to penetrate into the compaction layer 266. In this respect, it is generally desirable for the tillage tool(s) (e.g., the shank(s) 124) of the tillage implement 102 to penetrate through the bottom surface 270 of the compaction layer 266 to fully fracture the compaction layer 266 during a tillage operation.

Figure 6:
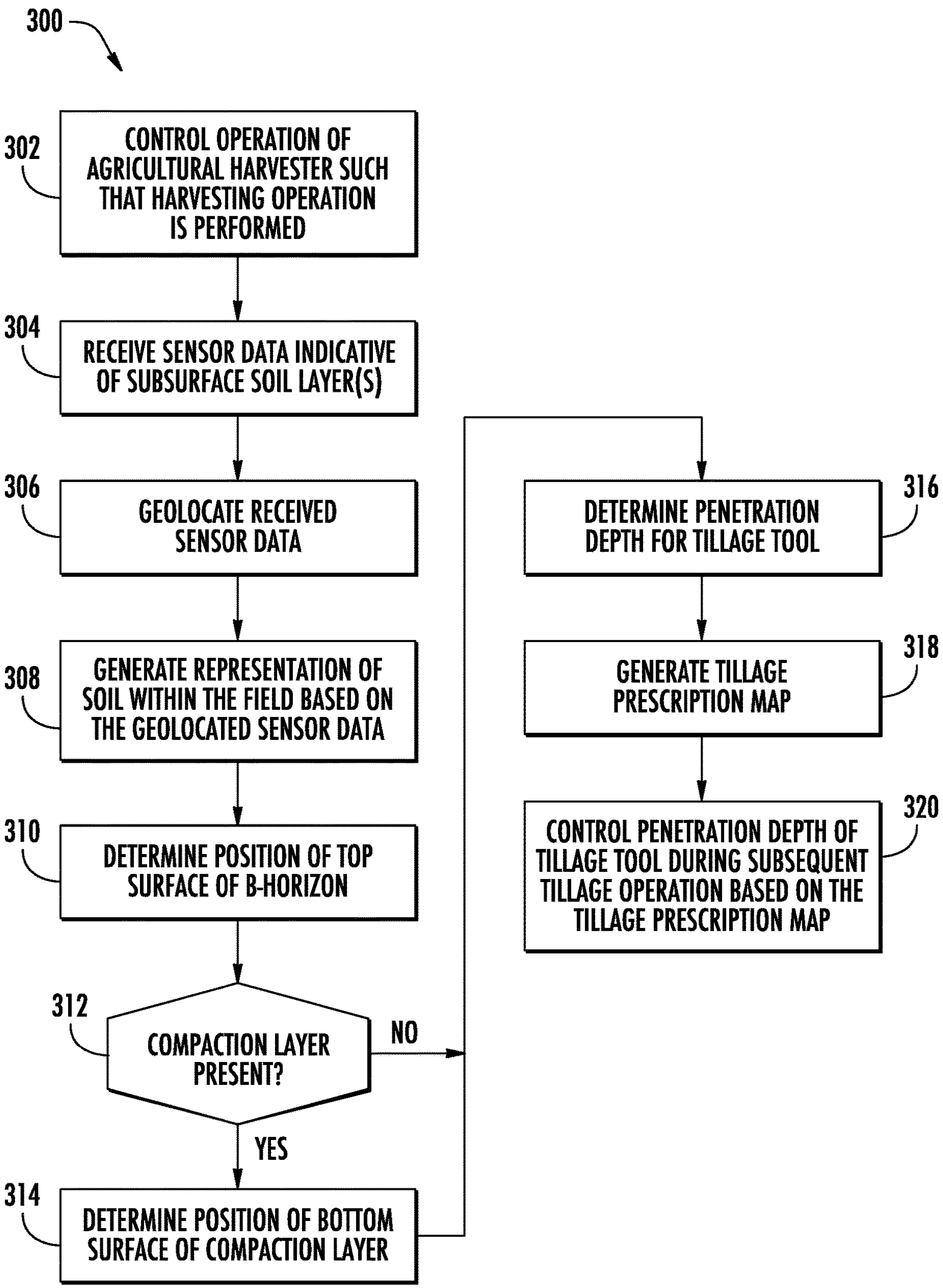
FIG. 6 illustrates a flow diagram providing one embodiment of example control logic for generating tillage prescription maps in accordance with aspects of the present subject matter.

Referring now to FIG. 6, a flow diagram of one embodiment of example control logic 300 that may be executed by the computing system 222 (or any other suitable computing system) for generating tillage prescription maps is illustrated in accordance with aspects of the present subject matter. Specifically, the control logic 300 shown in FIG. 6 is representative of steps of one embodiment of an algorithm that can be executed to generate tillage prescription maps prior to a tillage operation without the need for farmer to traverse the entirety of the field when not performing an agricultural operation thereon. Thus, in several embodiments, the control logic 300 may be advantageously utilized in association with a system installed on or forming part of an agricultural harvester to allow for the generation a tillage prescription map based on sensor data collected during an agricultural harvesting operation without requiring substantial computing resources and/or processing time. However, in other embodiments, the control logic 300 may be used in association with any other suitable system, application, and/or the like for generating tillage prescription maps.

As shown in FIG. 6, at (302), the control logic 300 includes controlling the operation of an agricultural harvester such that the agricultural harvester travels across a field to perform a harvesting operation thereon. Specifically, in several embodiments, the computing system 222 may be configured to control the operation of the one or more components of the agricultural harvester 10 (e.g., the engine 210, the transmission 212, the crop processing system 36, etc.) such that the harvester 10 travels across the field to perform a harvesting operation on the field. For example, the computing system 222 may transmit control signals to the component(s) of the harvester 10 via the communicative link 224. The control signals may, in turn, instruct the component (s) of the harvester 10 to operate in a manner such that a standing crop within a field is harvested.

Furthermore, at (304), the control logic 300 includes receiving data from a soil sensor(s) supported on the agricultural harvester that is indicative of one or more subsurface soil layers present within the field as the harvester travels across the field. More specifically, as indicated above, the computing system 222 is communicatively coupled to the soil sensor(s) 202 supported on the agricultural harvester 10 via the communicative link 224. In this respect, as the agricultural harvester 10 travels across the field to perform the harvesting operation thereon, the computing system 222 may be configured to receive soil data from the soil sensor(s) 202 that is indicative of the subsurface soil layer(s) present within the field.

Additionally, at (306), the control logic 300 includes geolocating the received soil sensor data. More specifically, as indicated above, the computing system 222 is communicatively coupled to the harvester location sensor 214 via the communicative link 224. In this respect, as the agricultural harvester 10 travels across the field to perform the harvesting operation thereon, the computing system 222 may be configured to receive location data (e.g., coordinates) from harvester location sensor 214 that is indicative of the location of the agricultural harvester 10 (and, thus, the soil sensor(s) 202) within the field. For example, both the received soil sensor data and the received location data may be time-stamped. Thus, the computing system 222 may match the soil sensor data and the location data based on the associated time stamps such that each soil sensor data sample is correlated to a specific location within the field. As will be described below, the geolocated soil sensor data may be used to identify one or more soil layers within the field. The identified soil layer(s) is, in turn, used to generate a tillage prescription map.

Moreover, at (308), the control logic 300 include generating a representation of the soil within the field based on the geolocated sensor data. Specifically, in several embodiments, the computing system 222 may be configured to analyze/process the geolocated soil sensor data (e.g., the sensor data received at (304) and geolocated at (306)) to generate a representation of the soil within the field. As such, the computing system 222 may include a suitable algorithm (s) stored within its memory device(s) 228 that, when executed by the processor(s) 226, generates the representation of the soil from the geolocated soil sensor data (e.g., the GPR data captured by the GPR sensing device(s) 218 and the EMI data captured by the EMI sensing device 220).

The representation of the soil within the field may correspond to any suitable data structure depicts or otherwise provides an indication of the soil structure adjacent to the top surface of the field based on the geolocated soil sensor data. For example, in several embodiments, the representation of the soil may correspond to a three-dimensional image(s) or spatial model illustrating or depicting one or more subsurface soil layers. In this respect, the generated three-dimensional representation may provide an indication of various parameters associated with one or more subsurface soil layers present within the field across which the harvester 10 is traveling. For example, such parameters may include the position or depth of the bottom and/or top surface of the subsurface soil layer(s) relative to the top surface of the field, the thickness of the subsurface soil layer(s), and/or the like. However, in alternative embodiments, the generated representation of the soil may correspond to any other suitable type of data structure, such as a one- or two-dimensional representation or dataset.

The representation generated at (308) generally depicts or otherwise provides information regarding the subsurface soil layer(s) at a plurality of locations within the field. Specifically, the subsurface soil layer(s) depicted at each location in the representation may be determined based on a particular data sample captured by one of the soil sensors 202 when the harvester 10 was present at that location. As such, each location within the field may associated one or more corresponding GPR data samples and one or more corresponding EMI data samples. In this respect, for purposes of clarity, (310)-(316) of the control logic 300 will be described in the context of determining subsurface soil layer parameters at a single given location of the plurality locations depicted in the generated representation. As such, (310)-(316) of the control logic 300 may be performed for each other location depicted within the generated representation.

At (310), the control logic 300 includes determining the position of the top surface of the B-horizon at the given location within the field based on the generated representation. Specifically, in several embodiments, the computing system 222 may be configured to analyze the representation of the soil generated at (308) to determine the position of the top surface of the B-horizon (e.g., the position of the A-B horizon interface 262 shown in FIG. 5) at the given location within the field. As will be described below, the determined location of the top surface of the B-horizon at the given location within the field may be used when determining the tillage tool penetration depth for that given location. However, in alternative embodiments, the position of the top surface of the B-horizon at the given location within the field may be determined in any other suitable manner. For example, in one embodiment, the position of the top surface of the B-horizon at the given location may be determined directly based on the EMI data captured at that given location.

As shown in FIG. 6, at (312), the control logic 300 includes determining whether a compaction layer is present at the given location within the field. Specifically, in several embodiments, the computing system 222 may be configured to analyze the representation of the soil generated at (308) to determine whether a compaction layer (e.g., the compaction layer 266 shown in FIG. 5) is present at the given location within the field. When it is determined that no compaction layer is present at the given location within the field, the control logic 300 proceeds to (316).

Conversely, when it is determined that a compaction layer is present at the given location within the field, the control logic 300 proceeds to (314). As shown, at (314), the control logic 300 includes determining the position of the bottom surface of the compaction layer at the given location within the field based on the generated representation. Specifically, in several embodiments, the computing system 222 may be configured to analyze the representation of the soil generated at (308) to determine the position of the bottom surface of the compaction layer (e.g., the position of the bottom surface 270 of the compaction layer 266 shown in FIG. 5) at the given location within the field. As will be described below, the determined location of the bottom surface of the compaction layer at the given location within the field may be used when determining the tillage tool penetration depth for the given location. However, in alternative embodiments, the position of the bottom surface of the compaction layer at the given within the field may be determined in any other suitable manner. For example, in one embodiment, the position of the bottom surface of the compaction layer at the given location may be determined directly based on the GPR data captured at the given location.

Furthermore, at (316), the control logic 300 includes determining a prescribed penetration depth for one or more tillage tools of a tillage implement for the given location based on the determined positions of the top surface of the B-horizon and/or the bottom surface of the compaction layer. Specifically, in several embodiments, the computing system 222 may be configured to determine a prescribed penetration depth of one or more tillage tools (e.g., the shanks 124) of the tillage implement 102 based on the position of the top surface of the B-horizon determined at (310) and the position of the bottom surface of the compaction layer (when present) determined at (314). Such determined penetration depth for the tillage tools may be prescribed such that the tip(s) of the tool(s) (e.g., the tips 130 of the shanks 124) are positioned above the top surface of the B-horizon and below the bottom surface of the compaction layer (when present) in the vertical direction (e.g., between the bottom surface 270 of the compaction layer 266 and the A-B horizon interface 262 in the vertical direction 256 as shown in FIG. 5). This allows for the tillage tool(s) to completely penetrate through the compaction layer to fully break up the compaction layer without mixing clay from the B-horizon into the A-horizon. For example, in some embodiments, the determined penetration depth for the tillage tool(s) at the given location may be prescribed such that the tip(s) of the tillage tool(s) is maintained at a selected distance below the bottom surface of the compaction layer in the vertical direction at the given location. This, in turn, ensures that the tillage tool(s) penetrate all of the way through the bottom surface of the compaction layer to fully break up the compaction layer. As mentioned above, (310)-(316) of the control logic 300 may be repeated for each other location of the plurality of locations depicted within the generated representation.

Additionally, at (318), the control logic 300 includes generating a tillage prescription map for the field based on the determined tillage tool penetration depths. Specifically, in several embodiments, the computing system 222 may be configured to generate a tillage prescription map for the field based on the tillage tool penetration depths for each of the plurality of locations depicted within the generated representations. In this respect, for each location within the field, the tillage prescription map provides a corresponding penetration depth for the tillage tool(s). Thereafter, the generated tillage prescription map may be stored in the memory device(s) 228 of the computing system 222 for use during a subsequent tillage operation.

The generated tillage prescription map may correspond to any suitable data structure that provides a corresponding penetration depth for the tillage tool(s) at a plurality of locations within the field. For example, in one embodiment, the tillage prescription may be a data table having a first column providing a location within the field (e.g., coordinates) and a second column providing a penetration depth corresponding to each location within the first column. However, in alternative embodiments, the generated tillage prescription map may correspond to a more complex data structure, such as a geospatial numerical model that can be used to identify the tillage tool penetration depth at a plurality of locations within the field.

Moreover, at (320), the control logic 300 includes controlling the penetration depth of the tillage tool(s) of the tillage implement during a subsequent tillage operation based on the generated tillage prescription map. More specifically, as indicated above, the computing system 222 is communicatively coupled to the tillage location sensor 216 via the communicative link 224. In this respect, as the vehicle/tillage implement 100/102 travels across the field to perform a subsequent tillage operation thereon, the computing system 222 may be configured to receive location data (e.g., coordinates) from tillage implement location sensor 216 that is indicative of the location of the tillage implement 102 (and, thus, the tillage tool(s)) within the field. In this respect, the computing system 222 may access the tillage prescription map generated at (318) and stored within its memory device(s) 228 to determine the corresponding penetration depth(s) for the tillage tool(s) (e.g., the shanks 124) at the current location of the tillage implement 102. Thereafter, the computing system 222 may control the operation of the tillage tool actuator(s) 204 on the tillage implement 102 such that the tillage tool(s) are moved to the penetration depth prescribed for the current location by the tillage prescription map. For example, the computing system 222 may transmit control signals to the tillage tool actuator(s) 204 via the communicative link 224. The control signals, in turn, instruct the tillage tool actuator(s) 204 to adjust the penetration depth of the shanks 124 such that the tips 130 of the shanks 124 are positioned at the penetration depth prescribed by the tillage prescription map for the current location.

Figure 7:
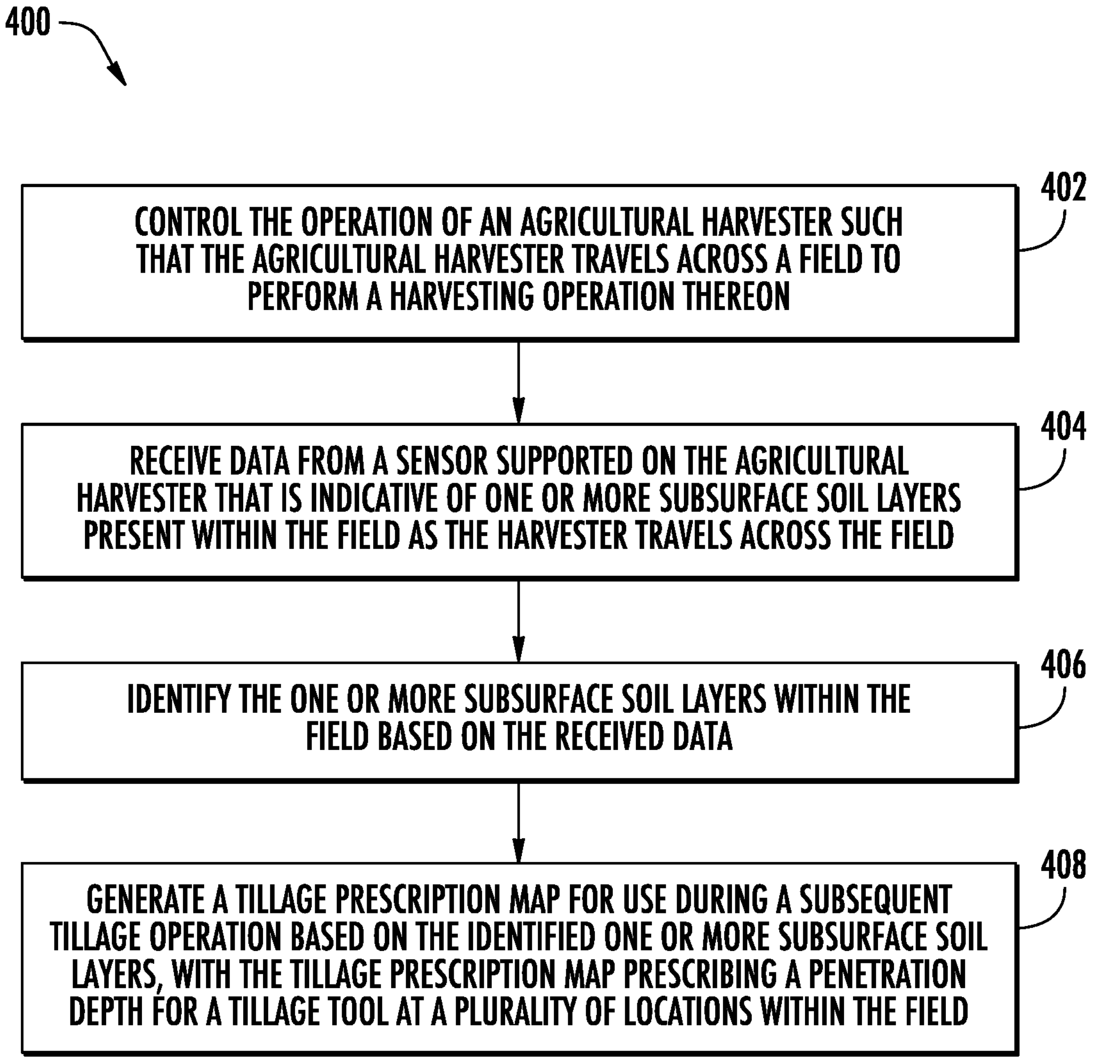
FIG. 7 illustrates a flow diagram of one embodiment of a method for generating tillage prescription maps in accordance with aspects of the present subject matter.

Referring now to FIG. 7, a flow diagram of one embodiment of a method 400 for generating tillage prescription maps is illustrated in accordance with aspects of the present subject matter. In general, the method 400 will be described herein with reference to the agricultural harvester 10, the tillage implement 102, and the system 200 described above with reference to FIGS. 1-6. However, it should be appreciated by those of ordinary skill in the art that the disclosed method 400 may generally be implemented with any agricultural harvester having any suitable harvester configuration, any tillage implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (402), the method 400 includes controlling, with a computing system, the operation of an agricultural harvester such that the agricultural harvester travels across a field to perform a harvesting operation thereon. For instance, as described above, the computing system 222 may be configured to control the operation of the agricultural harvester 10 (e.g., its engine 210, transmission 212, crop processing system 36, etc.) such that the harvester 10 travels across a field to perform a harvesting operation thereon.

Additionally, at (404), the method 400 includes receiving, with the computing system, data from a sensor that is indicative of one or more subsurface soil layers present within the field as the agricultural harvester travels across the field. For instance, as described above, the computing system 222 may be configured to receive data from the soil sensor(s) 202 supported on the agricultural harvester 10 as the harvester 10 travels across the field. The data received from the soil sensor(s) 202 is, turn, indicative of one or more subsurface soil layers present within the field.

Moreover, as shown in FIG. 7, at (406), the method 400 includes identifying, with the computing system, the one or more subsurface soil layers within the field based on the received data. For instance, as described above, the computing system 222 may be configured to identify the one or more subsurface soil layers (e.g., a compaction layer, the B-horizon, etc.) present within the field based on the received soil sensor data.

Furthermore, at (408), the method 400 includes generating, with the computing system, a tillage prescription map for use during a subsequent tillage operation based on the identified one or more subsurface soil layers, with the tillage prescription map prescribing a penetration depth for a tillage tool at a plurality of locations within the field. For instance, as described above, the computing system 222 may be configured to generate a tillage prescription map for use during a subsequent tillage operation based on the identified subsurface soil layer(s). The tillage prescription map may, in turn, prescribe the penetration depths for shanks 124 of the tillage implement 102 at a plurality of locations within the field.

It is to be understood that the steps of the control logic 300 and the method 400 are performed by the computing system 222 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 222 described herein, such as the control logic 300 and the method 400, is implemented in software code or instructions which are tangibly stored on a tangible computer readable medium. The computing system 222 loads the software code or instructions via a direct interface with the computer readable medium or via a wired and/or wireless network. Upon loading and executing such software code or instructions by the computing system 222, the computing system 222 may perform any of the functionality of the computing system 222 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:

a frame;

front wheels coupled to the frame;

rear wheels coupled to the frame;

a crop processing system supported on the frame, the crop processing system including a threshing and separating assembly configured to thresh and separate harvested crop;

a straw hood supported on the frame through which impurities from the harvested crop are discharged;

a sensor supported on the frame and positioned aft of the rear wheels and adjacent to the straw hood, the sensor configured to capture data indicative of a B-horizon present within the field across which the agricultural harvester is traveling; and a computing system communicatively coupled to the sensor, wherein the computing system:

identifies the B-horizon within the field based on the data captured by the sensor, including generating a representation of the soil within the field based on the data captured by the sensor, the representation depicting the B-horizon, and determining a position of a top surface of the B-horizon within the field based on the generated representation; and generates a tillage prescription map for use during a subsequent tillage operation based on the identified B-horizon, the tillage prescription map prescribing a penetration depth for a tillage tool at a plurality of locations within the field.

2. The agricultural harvester of claim 1, wherein the sensor comprises a non-contact-based sensor.

3. The agricultural harvester of claim 2, wherein the sensor comprises a ground-penetrating radar sensing device and an electromagnetic induction sensing device.

4. The agricultural harvester of claim 3, wherein the ground-penetrating radar sensing device corresponds to a first ground-penetrating radar sensing device configured to operate at a first frequency, the sensor further comprising a second ground-penetrating radar sensing device configured to operate at a second frequency, the second frequency differing from the first frequency.

5. The agricultural harvester of claim 1, wherein the sensor corresponds to a first sensor supported at a first location on the frame and configured to capture first data, the agricultural harvester further comprising:

a second sensor supported on the frame at a second location, the second sensor configured to capture second data indicative of the B-horizon present within the field across which the agricultural harvester is traveling.

6. The system of claim 1, wherein the computing system determines the penetration depth for the tillage tool at a particular location such that a tip of the tillage tool is positioned between a bottom surface of a compaction layer and the top surface of the B-horizon in the vertical direction at the particular location.

7. A system for generating tillage prescription maps, the system comprising:

an agricultural harvester configured to travel across a field to perform an agricultural harvesting operation on the field;

a sensor supported on the agricultural harvester, the sensor configured to capture data indicative of a B-horizon present within the field across which the agricultural harvester is traveling;

a tillage implement configured to travel across the field to perform a tillage operation on the field, the tillage implement including a tillage tool; and a computing system communicatively coupled to the sensor, the computing system configured to:

controls an operation of the agricultural harvester such that the agricultural harvester travels across the field to perform the harvesting operation;

receives data from the sensor that is indicative of the B-horizon present within the field as the agricultural harvester travels across the field;

identifies the B-horizon within the field based on the data captured by the sensor, including generating a representation of the soil within the field based on the data captured by the sensor, the representation depicting the B-horizon, and determining a position of a top surface of the B-horizon within the field based on the generated representation;

generates a tillage prescription map for use during a subsequent tillage operation based on the identified B-horizon, the tillage prescription map prescribing a penetration depth for a tillage tool at a plurality of locations within the field; and controls a penetration depth of the tillage tool based on the tillage prescription map.

8. The system of claim 7, wherein the sensor comprises a non-contact-based sensor.

9. The system of claim 8, wherein the sensor comprises a ground-penetrating radar sensing device and an electromagnetic induction sensing device.

10. The system of claim 9, wherein the ground-penetrating radar sensing device corresponds to a first ground-penetrating radar sensing device configured to operate at a first frequency, the sensor further comprising a second ground-penetrating radar sensing device configured to operate at a second frequency, the second frequency differing from the first frequency.

11. The system of claim 7, wherein, when identifying the B-horizon, the computing system generates a representation of the soil within the field based on the data captured by the sensor, the representation depicting the B-horizon.

12. The system of claim 7, wherein the tillage tool comprises a ground-penetrating shank.

13. A method for generating tillage prescription maps using an agricultural harvester, the agricultural harvester including a frame and a sensor supported on the frame, the method comprising:

controlling, with a computing system, an operation of the agricultural harvester such that the agricultural harvester travels across a field to perform a harvesting operation thereon;

receiving, with the computing system, data from the sensor that is indicative of a B-horizon present within the field as the agricultural harvester travels across the field;

identifying, with the computing system, the B-horizon within the field based on the received data, including generating, with the computing system, a representation of the soil within the field based on the data captured by the sensor, and determining, with the computing system, a position of a top surface of the B-horizon within the field based on the generated representation;

generating, with the computing system, a tillage prescription map for use during a subsequent tillage operation based on the identified B-horizon, the tillage prescription map prescribing a penetration depth for a tillage tool at a plurality of locations within the field; and controlling, with the computing system, a penetration depth of a tillage tool of a tillage implement based on the tillage prescription map.

14. The method of claim 13, wherein identifying the B-horizon comprises generating, with the computing system, a representation of the soil within the field based on the data captured by the sensor.

* * * * *